Oct. 17, 1967     M. BODIAN ET AL     3,348,036

EXAMINATION LIGHT

Filed Oct. 15, 1965     5 Sheets-Sheet 1

INVENTORS
MARCUS BODIAN
FREDERICK J. WELLHOUSE
BY

ATTORNEY

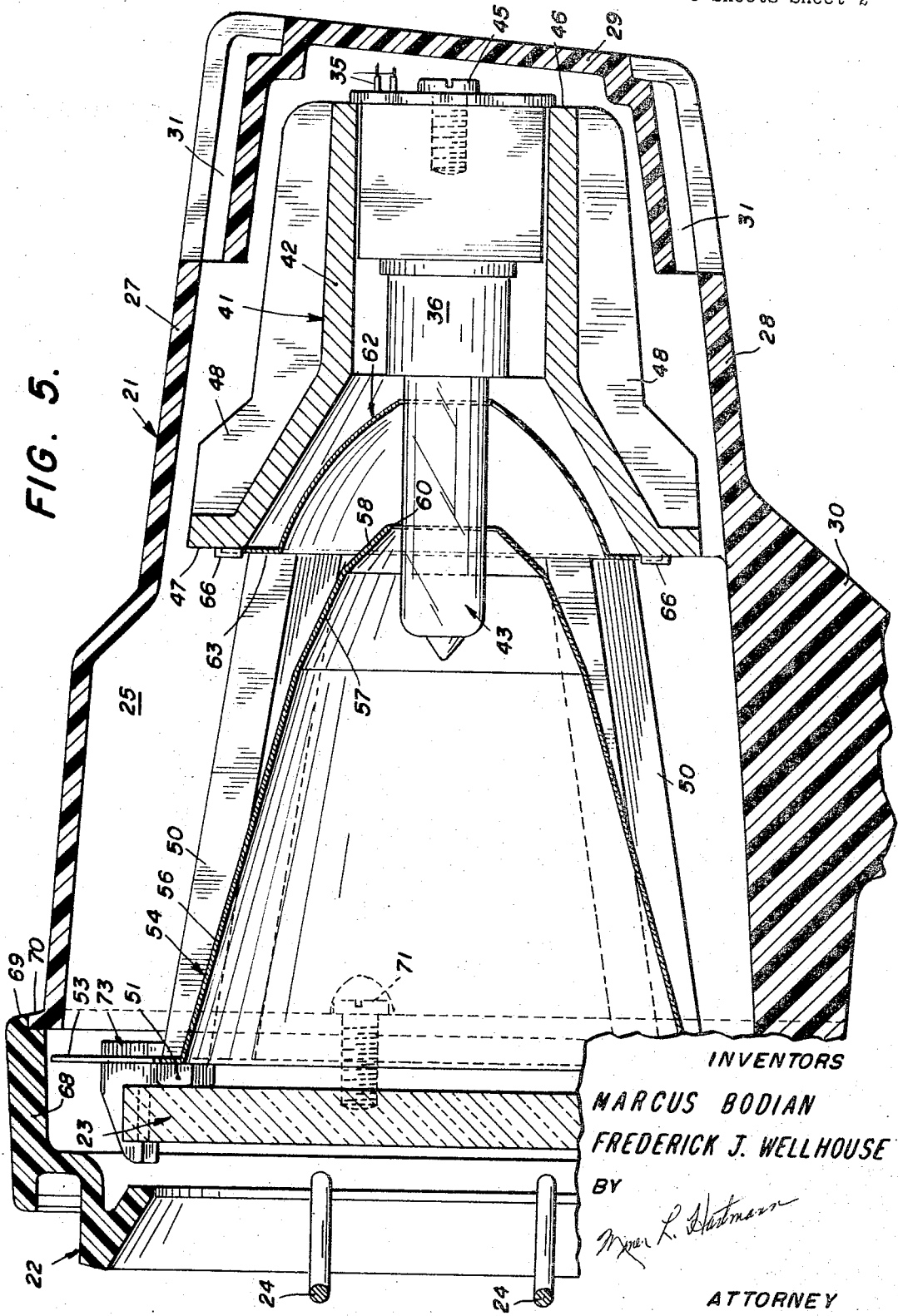

Oct. 17, 1967

M. BODIAN ETAL 3,348,036

EXAMINATION LIGHT

Filed Oct. 15, 1965

INVENTORS
MARCUS BODIAN
FREDERICK J. WELLHOUSE
BY

ATTORNEY

INVENTORS
MARCUS BODIAN
FREDERICK J. WELLHOUSE
BY

ATTORNEY

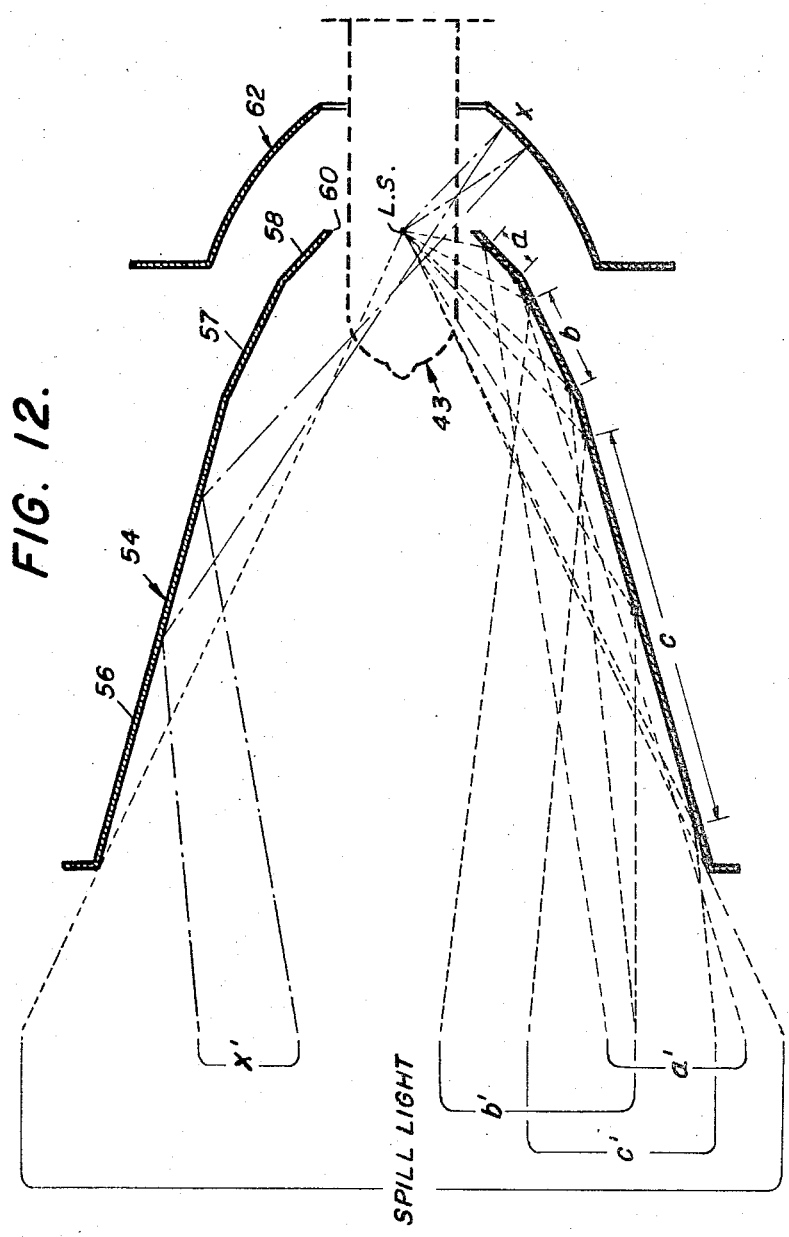

United States Patent Office 3,348,036
Patented Oct. 17, 1967

3,348,036
EXAMINATION LIGHT
Marcus Bodian, Los Angeles, and Frederick J. Wellhouse, Menlo Park, Calif., assignors to Sunbeam Lighting Co. Inc., a corporation of California
Filed Oct. 15, 1965, Ser. No. 496,631
6 Claims. (Cl. 240—41.35)

ABSTRACT OF THE DISCLOSURE

An examination light means having a high temperature incandescent lamp, with air cooling means for preventing overheating of the housing, and with a reflector system concentrating the generated light to evenly illuminate a relatively large nearby target area with a sharp cut-off of light at the edges of the target.

---

This invention relates to an examination light, and in particular to an examination light arranged to give an even intensity of illumination over a relatively large nearby target and to provide a sharp cut-off of light at the edges of the target.

One object of the invention is to provide an examination light of uniform intensity whose beam covers a nearby target, with a sharp cut-off of light at the edges of the beam. Another object is to provide an examination light whose exterior remains cool enough for use in examining human patients. Another object is to provide within a lamp housing a heat absorbing metal mass to reduce the temperature of the housing during short operating periods of the high temperature lamp. A still further object is to provide a system of reflectors which efficiently projects the generated light to uniformly illuminate a relatively large target area a short distance from the light, and which gives a sharp cut-off at the perimeter of the target.

These and other objects are attained by our invention which will be understood from the following description, reference being made to the accompanying drawings in which FIG. 1 is a side elevational view of the examination light of this invention;

FIG. 5 is a vertical longitudinal cross-sectional view of the examination light, including the front closure, taken along the optical axis;

FIG. 12 is an optical diagram of a typical reflector system of this invention.

Figure 1:
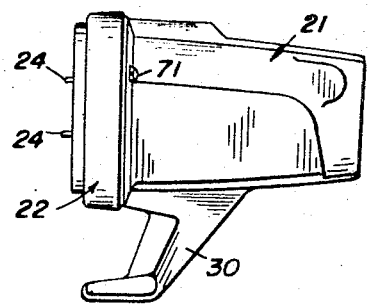
Figure 2:
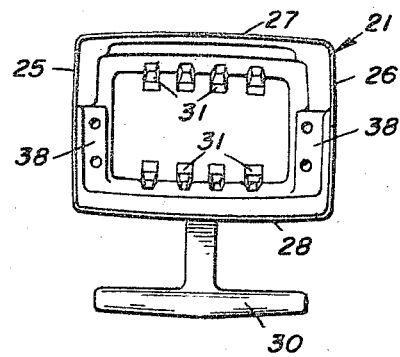
FIG. 2 is a front elevational view of the housing for the light, with the front closure removed.
Figure 3:
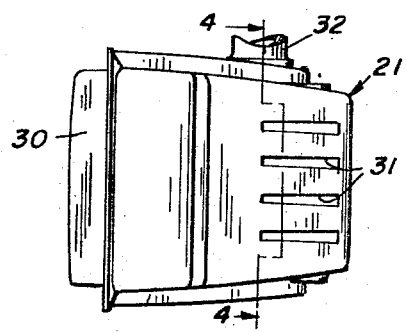
FIG. 3 is a top plan view of the housing with the front closure removed.
Figure 4:
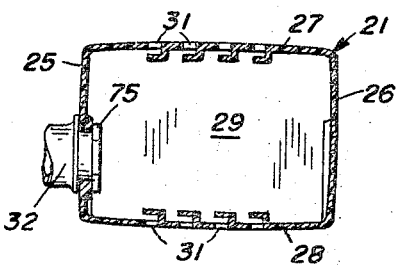
FIG. 4 is a cross-sectional view taken on the line 4—4 of FIG. 3.
Figure 10:
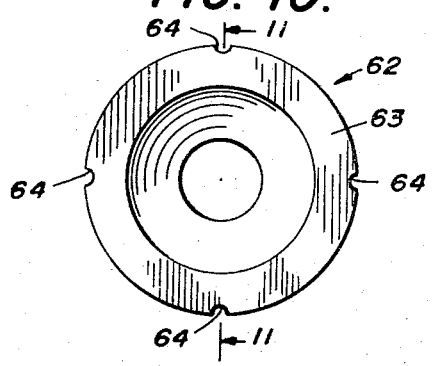
FIG. 10 is an end view of the rear reflector.

Referring to the drawings, a molded plastic box or housing 21, generally rectangular in shape, has a separable front closure 22 in which is mounted a lens 23 of heat absorbing glass protected by wire guards 24, and has left and right side walls respectively 25 and 26, top wall 27, bottom wall 28 and a back closure 29. A handle 30 of molded plastic material is formed integrally on the bottom wall 28. A tubular attachment piece 32 for holding the light device on the end of a supporting movable arm means (not shown) is provided on the side wall 25, this tubular piece 32 serving also as a conduit for the electrical connecting wires 34 to the switch means 33 and to the terminals 35 of the lamp socket 36. The electrical circuits are conventional and are omitted for clarity in the drawings.

Shoulders or offsets 38 are provided on the interior faces of the left and right side walls 25 and 26 for the attachment by screws 39 of out-turned flanges 40 of the metal frame 41.

The metal frame 41, which is preferably an aluminum die-casting, consists generally of a hollow funnel shaped body portion 42 having heat radiating ribs or fins extending from its outer surface. The metal body portion and the ribs serve as a heat-sink to absorb the heat from the high-intensity lamp 43 which is operatively mounted in a lamp socket 36 attached by screws 45 on the rear edge 46 of the body portion 42.

The fins or ribs 48, with certain exceptions to be noted, terminate a little distance above the front edge 47 of the body 41. Certain ribs, marked 49, terminate at the front edge 47 and are provided with outwardly turned flanges 40 which are adapted to be fastened to the offset shoulders 38 of the housing 21 by screws 39.

Certain other "long" ribs, marked 50, disposed 90° apart around the conical portion of the body 42, extend forwardly from said body, the ends terminating in out-turned tabs 51 adapted to engage cooperating slots 52 in the out-turned flange 53 of the main reflector 54, which will be described.

The main reflector 54, which generally surounds the forward portion of the lamp 43, consists of a unitary or fabricated metallic structure whose inside surface is specular, and which consists of a truncated front cone 56, whose smaller end is joined edgewise to a middle cone 57 at its larger end. The smaller end of the middle cone 57 is joined, edgewise, to the larger end of the rear cone 58, there being a ring-shaped opening 60 between the smaller end of the rear cone 58 and the cylindrical transparent bulb of the lamp 43.

The angular disposition of the walls of the several conical sections of the main reflector 54, with respect to the optical axis of the reflector, are determined by the size of the circle of uniform bright light which is to be generated on a target at the selected distance from the front edge of the main reflector as will be illustrated later.

Figure 11:
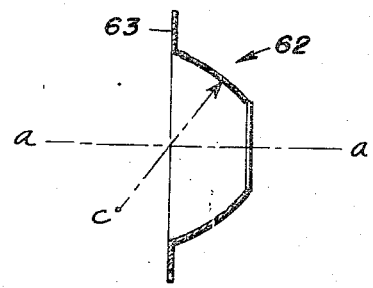
FIG. 11 is a cross-sectional view of the rear reflector taken on the line 11—11 of FIG. 10.

The auxiliary or small reflector 62 is disposed rearwardly of the main reflector 54, and generally surrounds the rear portion of the transparent bulb of the lamp 43. The reflecting surface of the auxiliary reflector 62 is a portion of the curved surface of revolution generated by an arc of a circle whose center c is disposed on the far side of the projected axial center line a—a of the main reflector, as shown diagrammatically in the cross-sectional view, FIG. 11. The small reflector 62 is provided with an out-turned flange 63 which has edge notches 64 arranged to engage buttons 66 on the front edge surface 47 of the body portion 42.

The auxiliary or small reflector is aspherical with its axial center line on the same axis as the main reflector but not coincident with its focal point. Its center is slightly above or below that focal point so as not to direct the returning rays through the filament but through the lamp envelope adjacent the filament as indicated in FIG. 12, thus preventing overheating of the filament by the reflected rays from said aspherical reflector.

The front closure 22 of the housing 21 consists of a molded plastic frame 68 having a rim 69 which fits over the bead 70 on the front edge of the housing, being removably held by screws 71 engaging the housing 21. A circular opening is provided in the frame 68 through which the beam of light is projected. The opening is provided with guard wires 24.

Figure 8:
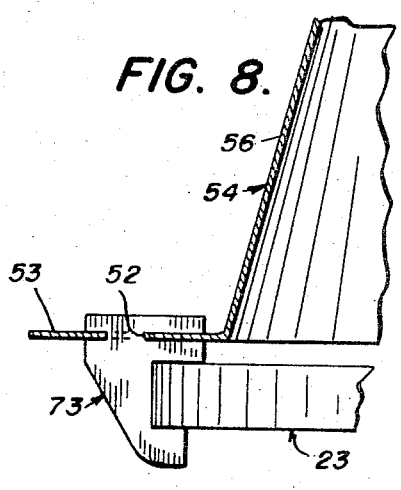
FIG. 8 is a cross-sectional view taken on the line 8—8 of FIG. 7.
Figure 9:
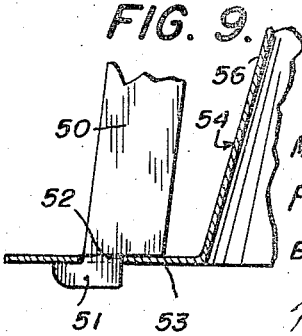
FIG. 9 is a cross-sectional view taken on the line 9—9 of FIG. 7.

A heat absorbing glass lens 23 is mounted on the out-turned flange 53 of the main reflector 54, by means of molded heat-resisting silicone rubber retainers 73 which are engaged in L-shaped slots in the flange 53 and are provided with grooves for holding the edge of the lens, as shown in FIG. 8.

The preferred type of lamp for use in this examination light is known in the trade as an "iodine" lamp, which in general consists of an elongated cylindrical clear quartz bulb mounted in a suitable base, and has a closely wound coil of tungsten wire disposed across the cylindrical bulb mounted on stiff lead-in wires, there being iodine vapor within the bulb. The lamp operates at high bulb surface temperature on a reduced voltage, about 28 volts. A lamp of this type is manufactured by Sylvania Electric Products Inc. under its designation 80W-28V.

Figure 6:
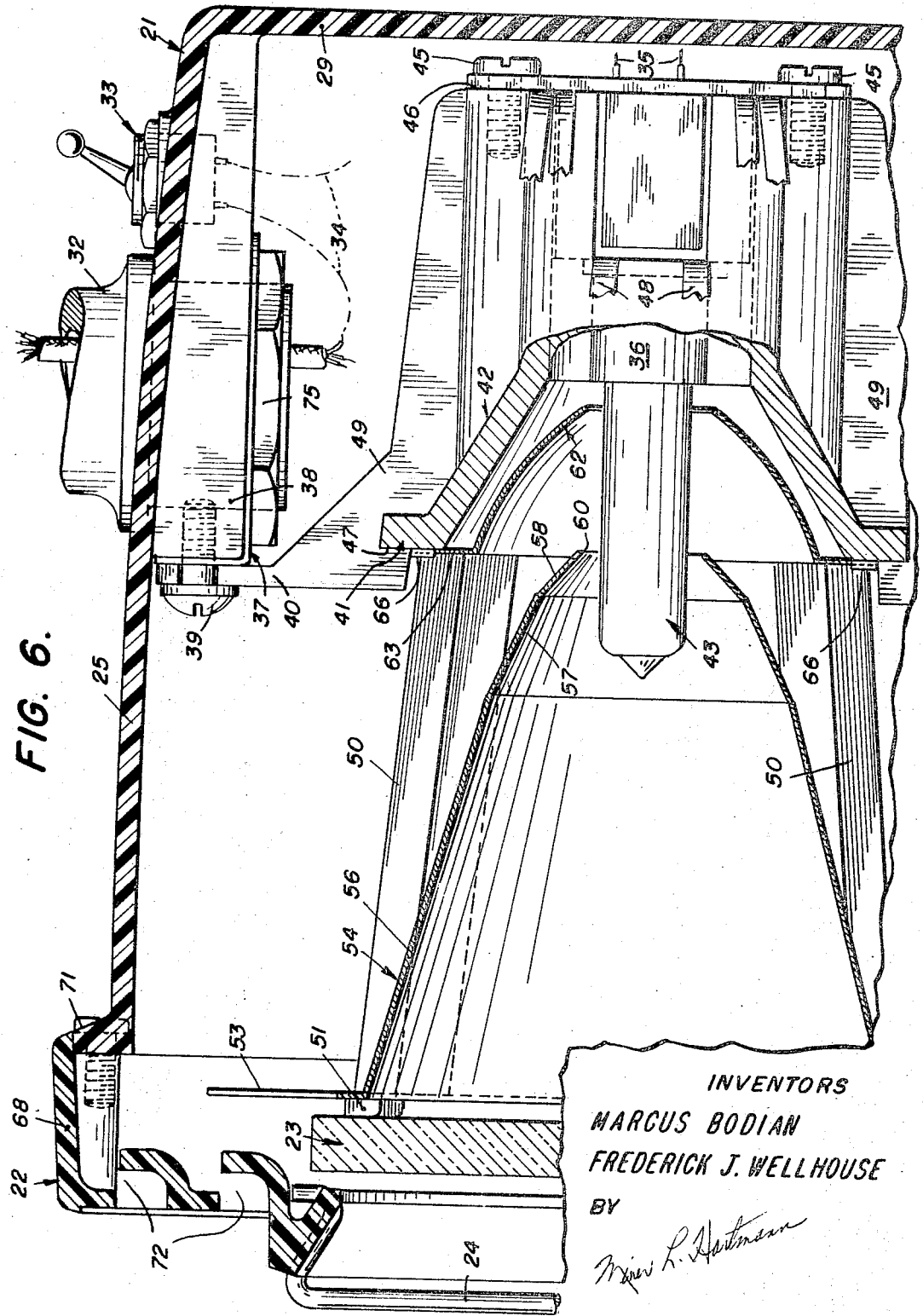
FIG. 6 is a horizontal longitudinal cross-sectional view of the examination light taken along the optical axis.
Figure 7:
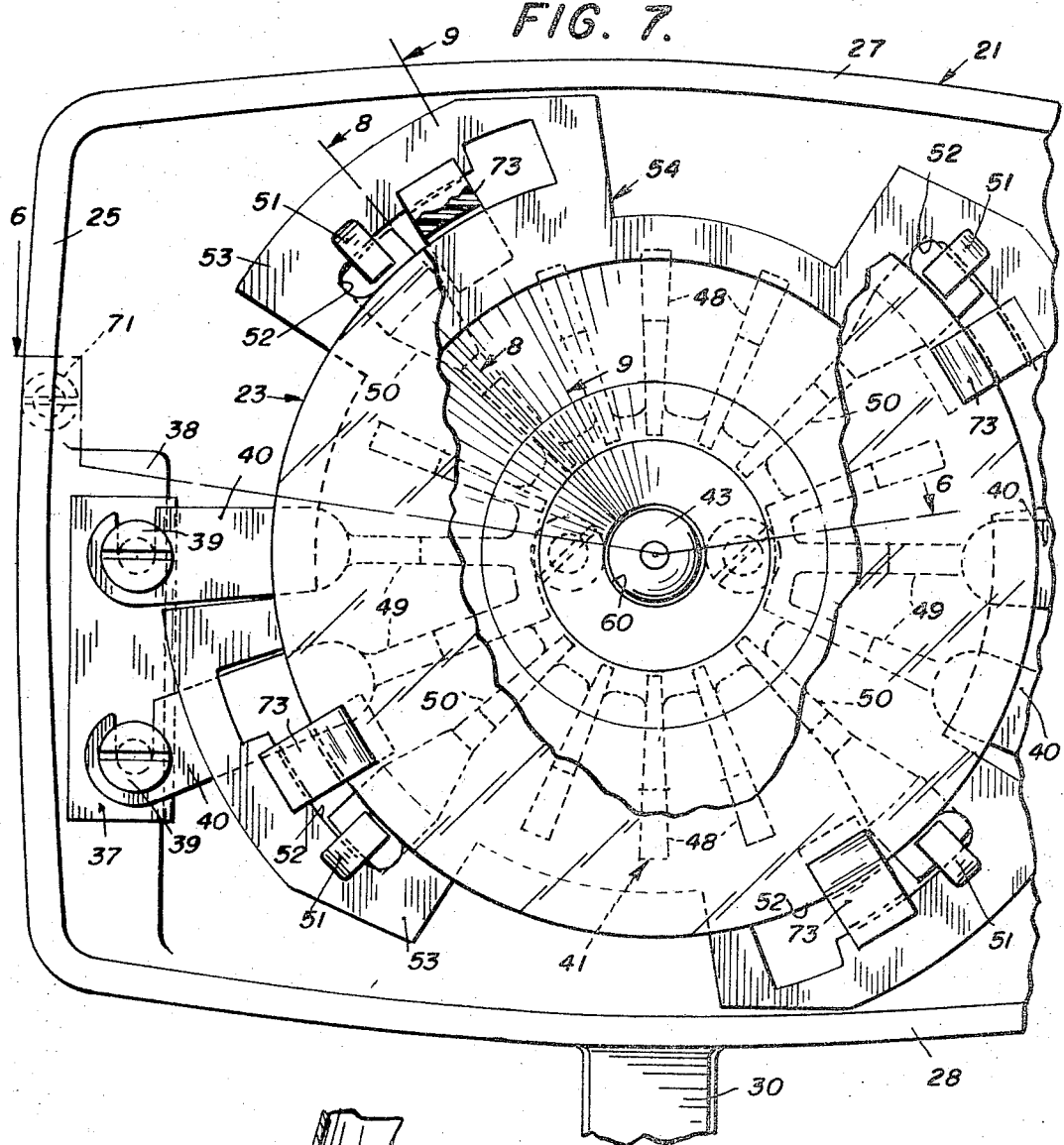
FIG. 7 is a front fragmentary elevational view (front closure removed) with the parts broken away.

Because of the high operating temperature of the lamp, natural draft air-cooling is provided through the louvre openings 31 in the housing 21, as shown particularly in FIGS. 2, 3, 4 and 5, and the louvre openings 72 and the circular opening for the light beam in the front closure 22 as shown particularly in FIG. 6. When the examination light is in use with the light beam directed downwardly, the cooling air enters through louvres 72 and the circular opening, and exits through the louvres 31 at the rear of the housing.

Some of the heat which accumulates in the "heat-sink" of the metal frame 41 is also conducted away from the interior of the examination light by means of the metal bracket 37 which is held at one end under the flange 40 by the screws 39, and at the other end by contact with the tubular metallic attachment piece 32 under the holding nut 75.

The optical system of the device is shown diagrammatically in FIG. 12, in which the light source is assumed (for illustration) to be a point, marked L.S. Representative light rays are shown by broken lines, lettered in groups for identification where they strike the several reflector surfaces. The light rays, for clarity, are shown for only one side of the diagram showing a diametric section.

In this invention, the area of the target receiving light from the reflector coincides with the total area receiving light directly from the filament of the lamp, leaving no stray light, reflected or direct, beyond the perimeter of the target.

In the diagram, FIG. 12, reflector areas *a*, *b*, and *c* reflect light from the light source L.S. over the corresponding target areas *a'*, *b'*, and *c'*. The summation of these areas, around the revolution, makes their total area correspond with the "spill light," i.e., the light which comes directly from the light source, L.S. (filament).

The several straight sided conical surfaces of revolution (56, 57, 58) constituting the main reflector (54), reflect each ray from the light source L.S. at a different angle, thereby producing a spreading of the light over the target area, without concentration at any point or points.

The auxiliary reflector (62), intercepting the light rays from the light source L.S. that emanate to the rear of the main reflector (54) acts to reflect these rays back through the lamp bulb to the main reflector where they are re-reflected out to the target area.

Thus, a combination of a plurality of straight sided truncated conical specular reflectors constituting a main reflector, a spherical surfaced specular auxiliary reflector, and a restriction by the forward reflector of the "spill light" to an area which coincides with the reflected light, produces an evenly lighted target area with a sharp cut-off at the perimeter of the target.

The advantages of our invention will be apparent from this description. The objectives stated in the beginning have been attained.

We claim:

1. An examination light comprising
a molded synthetic resin boxlike housing having a back wall, two side walls, top wall, bottom wall, and a front opening defined by said top wall, bottom wall and two side walls, said housing having vents for air circulation therethrough;
a removable front closure having an optical opening for a light beam generated by a lamp and reflector means enclosed within said housing;
a lamp-enclosing metallic frame mounted on said side walls within said housing, said frame having air-cooling fins disposed on its exterior surface, said fins extending into the space between said frame and said housing;
a high-intensity compact filament gas-filled lamp operatively mounted concentrically within said frame adjacent its rear portion;
a light reflector means for the light from said lamp mounted within said frame, said means generally surrounding said lamp, and adapted to direct the light therefrom into a conical beam having a sharp cut-off at the margins; and
means for attaching said housing to a supporting arm.

2. The examination light defined in claim 1, in which a heat absorbing lens is disposed across the beam of light between said light reflector means and said front closure.

3. The examination light defined in claim 1, in which said frame includes a plurality of integral radial fins some of which extend adjacent said reflector means for conducting the heat generated by the lamp into the air space between said frame and said housing.

4. The examination light defined in claim 1 in which said light reflector means includes a main reflector comprising a plurality of edge-joined truncated right circular metal cones whose axes coincide with the optical axis of the device, and whose cone angles increase by steps rearwardly, the cone angle of the forward cone defining the projected conical light beam; and in which the rear reflector cone is disposed away from the bulb of said lamp, and the central area of the conical reflecting surface of said rear cone is disposed in alignment with the center point of light of said lamp; and in which an auxiliary reflector is provided rearwardly of said main reflector and behind said lamp, said auxiliary reflector having a reflecting surface consisting of the surface of revolution generated by the arc of a circle whose center is adjacent to but not on the projected axial center line side of the optical axis of said main reflector, said auxiliary reflector being arranged to reflect back to the main reflector any light rays existing behind said light source.

5. A light reflector means comprising a main reflector and an auxiliary reflector, said main reflector consisting of a plurality of edge joined truncated right circular metal cones whose optical axes are in alignment, said metal cones having increasing cone angles by steps, the cone angle of the forward cone defining the projected conical light beam generated by a point of light source disposed adjacent the reflecting surface of the rearward cone; and said auxiliary reflector being disposed rearwardly of said main reflector and reflecting light rays existing behind said light source, said auxiliary reflector consisting of a surface of revolution generated by the arc of a circle whose center is adjacent but not on the projected axial center line of said main reflector.

6. An examination light comprising a molded synthetic resin boxlike housing having a back wall, side walls, top wall and bottom wall, said housing being provided with air vents; a removable front closure having an opening for the light beam; a high-heat capacity lamp-enclosing metallic frame mounted within said housing, and disposed away from the inner walls of said housing to provide cooling air spaces therebetween; a high-intensity compact filament lamp operatively mounted within said frame; light reflector means mounted within said frame and generally enclosing said lamp to direct the light into a conical beam; and means for attaching said housing to a supporting arm, said reflector means including a main reflector comprising a plurality of edge-joined truncated right circular metal cones whose axes coincide with the optical axis of the device, and whose cone angles increase by steps rearwardly, the cone angle of the forward cone defining the projected conical light beam, said rear reflector cone being disposed away from the bulb of said lamp, the central zone of the conical reflecting surface of said rear cone being disposed in alignment with the center point of light of said lamp.

References Cited

UNITED STATES PATENTS

| | | | |
|---|---|---|---|
| 2,494,058 | 1/1950 | Ries et al. | 240—1.4 X |
| 3,112,076 | 11/1963 | Bobrick | 240—1.4 X |
| 3,119,567 | 1/1964 | Schwarz | 240—47 |

FOREIGN PATENTS

| | | |
|---|---|---|
| 571,614 | 2/1924 | France. |
| 388,781 | 1/1924 | Germany. |
| 13,311 | 1913 | Great Britain. |
| 931,905 | 7/1963 | Great Britain. |
| 1,181,058 | 11/1964 | Germany. |

NORTON ANSHER, *Primary Examiner.*

DAVID L. JACOBSON, *Assistant Examiner.*